July 9, 1963 D. WIKTOR 3,097,275

CIRCUIT INTERRUPTERS

Filed Feb. 17, 1961 7 Sheets-Sheet 1

INVENTOR.
DOMINIK WIKTOR

BY Paul S Martin

ATTORNEY

July 9, 1963 D. WIKTOR 3,097,275

CIRCUIT INTERRUPTERS

Filed Feb. 17, 1961 7 Sheets-Sheet 2

INVENTOR.
DOMINIK WIKTOR

BY Paul S. Martin

ATTORNEY

CIRCUIT INTERRUPTERS

Filed Feb. 17, 1961 7 Sheets-Sheet 3

INVENTOR.
DOMINIK WIKTOR

BY Paul S. Martin

ATTORNEY

INVENTOR.
DOMINIK WIKTOR
BY Paul S. Martin
ATTORNEY

July 9, 1963 D. WIKTOR 3,097,275

CIRCUIT INTERRUPTERS

Filed Feb. 17, 1961 7 Sheets-Sheet 5

INVENTOR.
DOMINIK WIKTOR

BY Paul S Martin

ATTORNEY

INVENTOR.
DOMINIK WIKTOR
BY Paul S. Martin
ATTORNEY

INVENTOR.
DOMINIK WIKTOR
BY
Paul S. Martin
ATTORNEY

United States Patent Office 3,097,275

Patented July 9, 1963

3,097,275

CIRCUIT INTERRUPTERS

Dominik Wiktor, Irvington, N.J., assignor to Federal Pacific Electric Company, a corporation of Delaware Filed Feb. 17, 1961, Ser. No. 101,314
27 Claims. (Cl. 200—78)

This invention relates to circuit breakers and more particularly to circuit breakers having quick-make and quick-break characteristics and for that purpose having stored-energy closing mechanisms.

It is an object of this invention to provide an improved circuit breaker having high opening and closing speeds.

It is another object of this invention to provide an improved rugged, inexpensive and simple circuit breaker.

It is yet another object of this invention to provide an improved stored energy mechanism for operating circuit breakers and the like.

It is a further object of this invention to provide a circuit breaker utilizing a linkage of low inertia for operating and for automatically releasing the circuit breaker.

An illustrative circuit breaker is described in detail below with reference to the accompanying drawings, as an embodiment of the invention in its various aspects. This illustrative circuit breaker includes a novel spring energy-storage mechanism that is particularly related to the contact operating mechanism for effecting rapid contact-closing operation with firm contact-closing force at the conclusion of the closing stroke. The construction of the energy-storage mechanism is such that it achieves the operational requirements, yet is of relatively compact and light-weight construction. This mechanism includes a pair of links pivoted together so as to constitute a toggle, and energy-storage spring means biases the ends of the toggle toward each other. With this arrangement, the spring stress is a maximum when the toggle is extended, and it decreases as the toggle is operated through its working stroke. Despite the decay of spring force acting on the toggle during this stroke, the output force available at the knee of the toggle remains high, due to the changing angular relationships between the line of spring thrust and the toggle links, and between the toggle links themselves.

A trip-free linkage extends between the knee of the toggle and the moving contact arm in the embodiment to be detailed. This linkage includes a lost-motion connection to a drive link, such that immediately after a closing stroke of linkage operation the energy-storage mechanism can be recharged without disturbing the contact-operating linkage. Further, the linkage operated by this mechanism includes a contact-arm operating toggle that is erected or extended so as to develop high contact-closing force as the closing operation is completed. This is important to high contact pressure and firm closing action against blow-off forces associated with the contact-arm when closing occurs under short-circuit conditions.

The contact-operating linkage of this circuit breaker includes a pair of crossed levers, one being a driving lever and the other being a latch lever. These are coupled by an additional pair of links that make up a parallelogram with a fixed pivot where the levers cross and with the diagonally opposite pivot connected to a drive link that operates the contact arm. That diagonally opposite pivot may assume various positions when the circuit breaker is open, depending upon whether the circuit breaker has just been tripped open or whether it has been restored into a configuration suitable for reclosing. A cam follower on said "diagonally opposite" pivot cooperates with a cam that determines the opening limit of the movable contact arm.

As is usual, the linkage is trip-free. The particular linkage is of such proportions and of such construction as to provide for high speed opening of the contacts in response to a tripping operation. When the circuit breaker is tripped, the contact-pressure springs act initially to produce high opening acceleration of the movable contact arm, and continued opening and resetting motion of the linkage is assured by a further spring that is arranged to restore the parts into position for relatching and for reclosing by the stored-energy mechanism.

The circuit breaker disclosed, in common with usual circuit breakers of this class, includes overcurrent release apparatus for automatic opening operation. Normal opening operation is also effected by operating a release latch. In this sense the disclosed apparatus is well suited to use as a quick-made and quick-break switch. Consequently the term "circuit breaker" is intended as a convenient term of reference and without per se requiring an overload release device.

The nature of the invention in its various aspects and further objects and features of novelty will be appreciated from the illustrative embodiment below, in which reference is made to the accompanying drawings. In those drawings.

Figure 3:
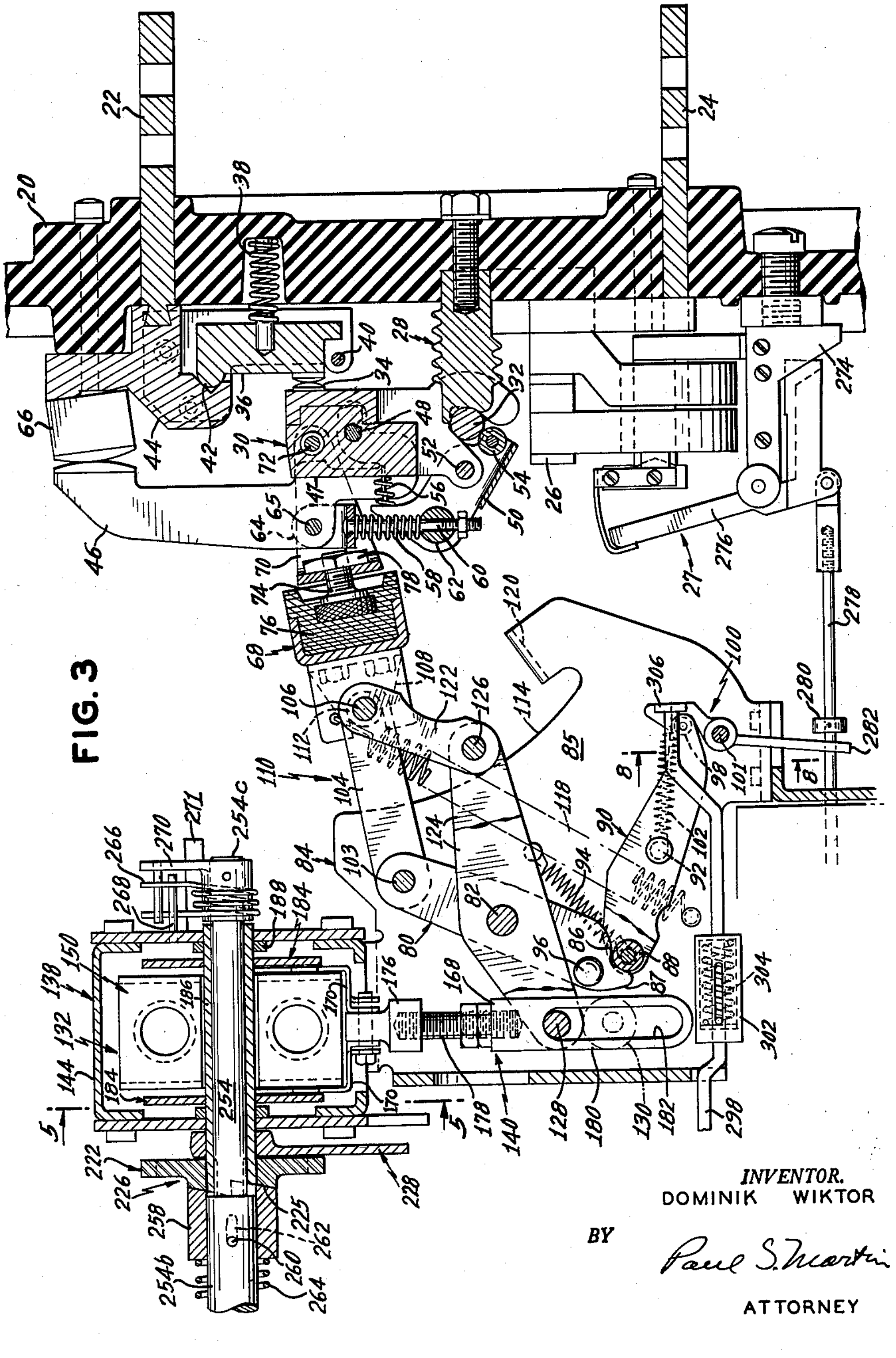
FIG. 3 is a vertical cross-section of the illustrative circuit breaker of FIGS. 1 and 2, taken along the line 3—3 of FIG. 1 and drawn to a somewhat larger scale and with certain parts broken away in the interests of clarity.
Figure 4:
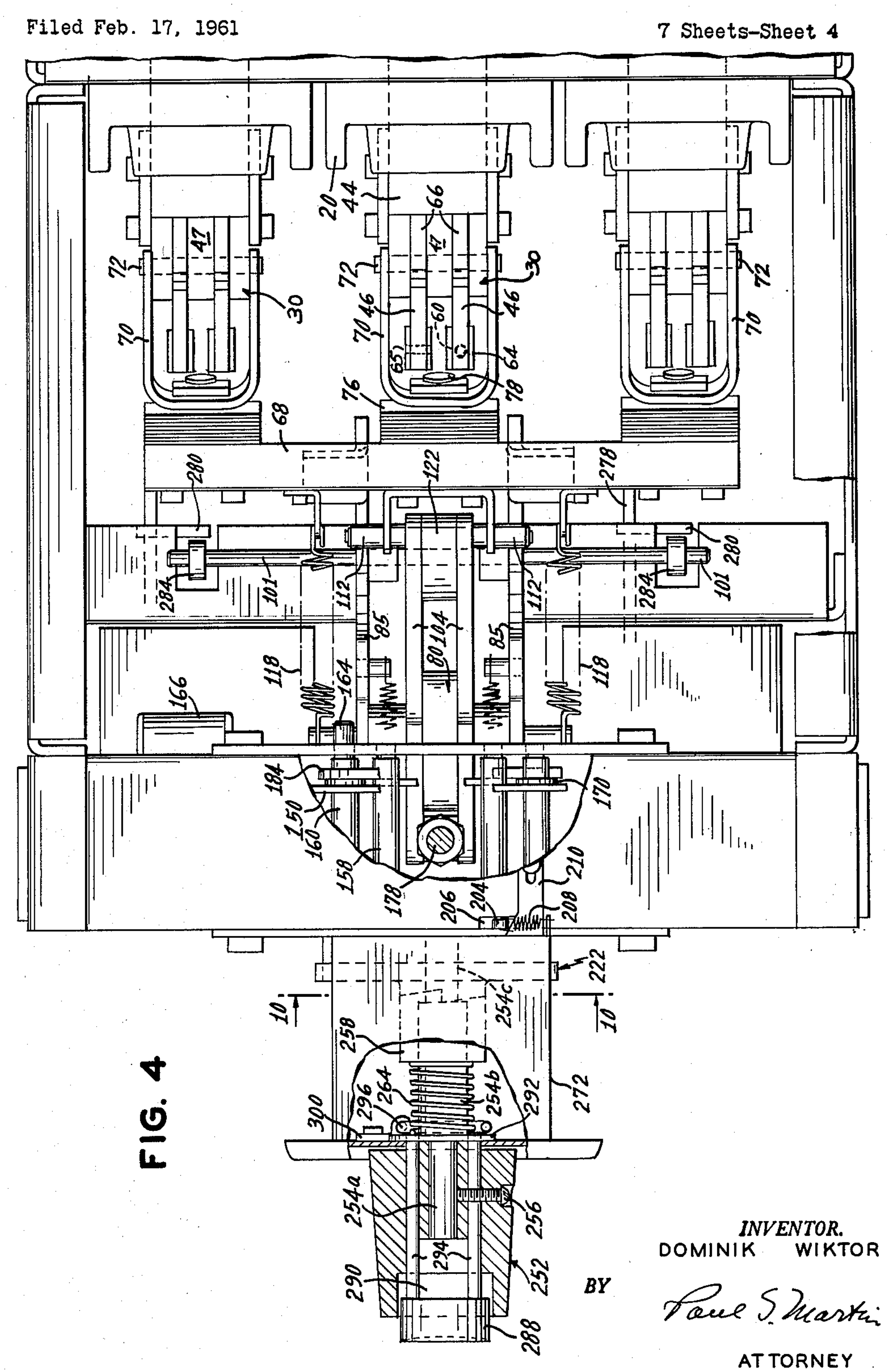
FIG. 4 is a plan view of the circuit breaker in FIGS. 1 to 3 with certain portions broken away for clarity.
Figure 4A:
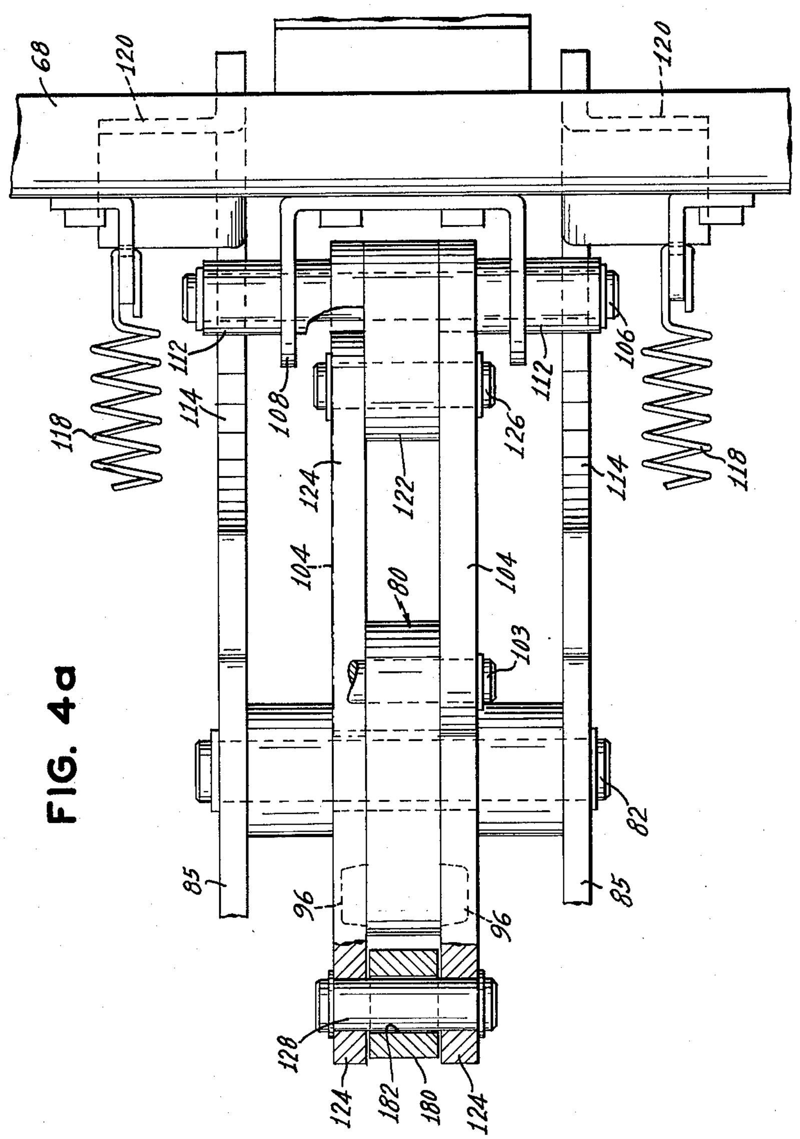
Figures 5, 6, 7:
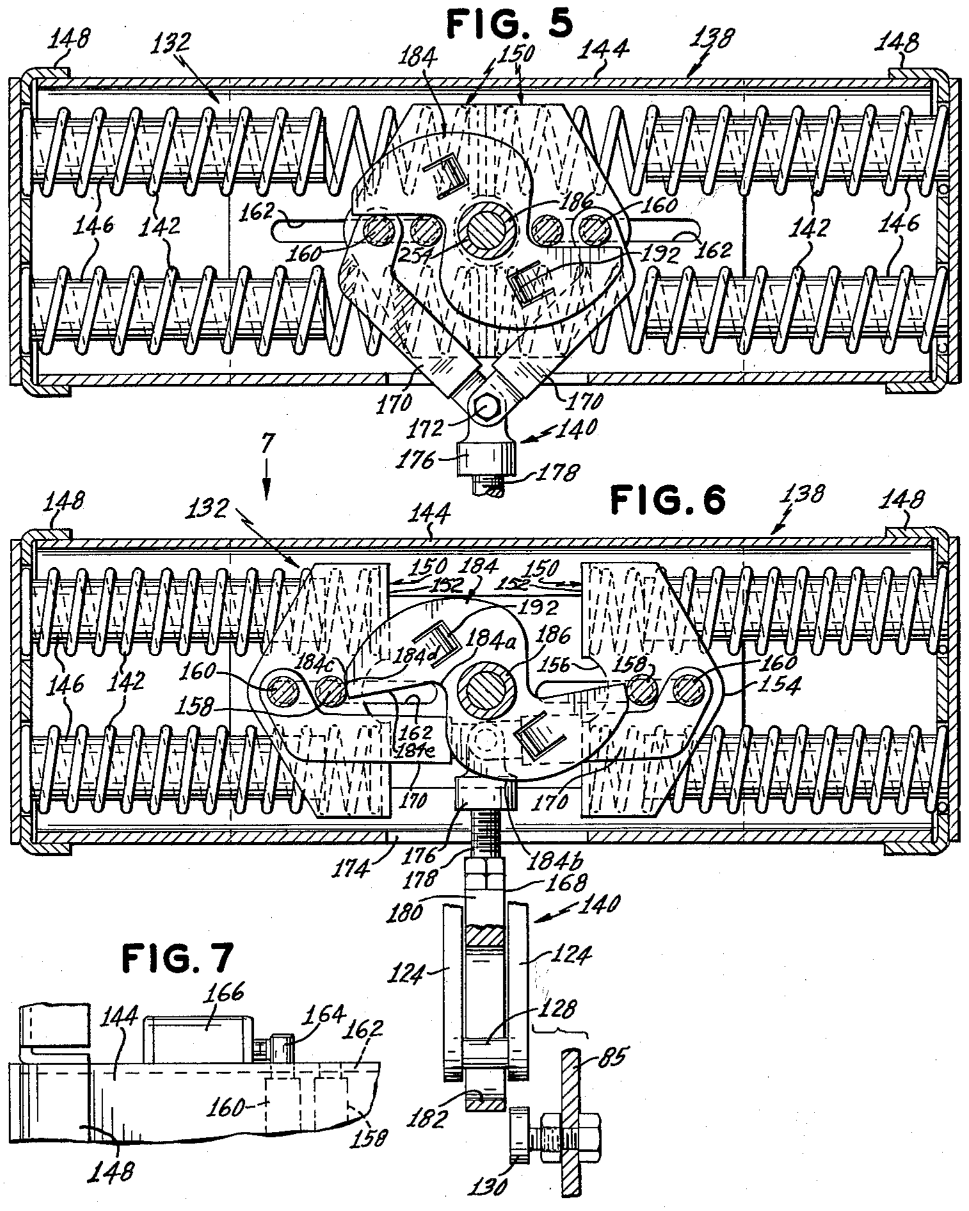
Figure 8:
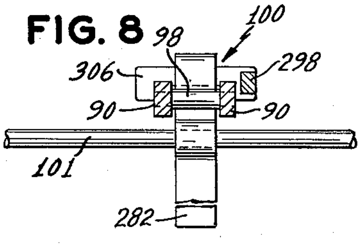
Figure 10:
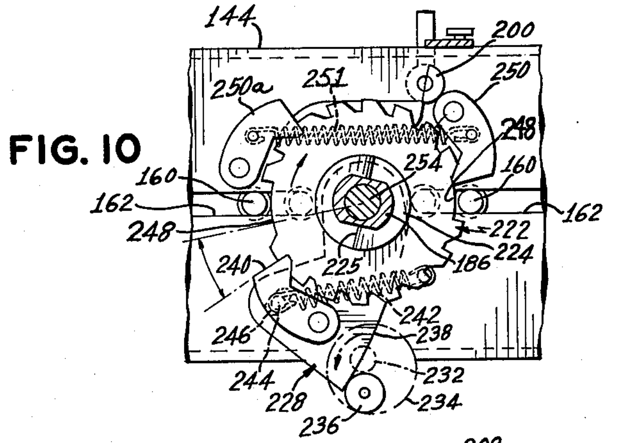
Figure 9:
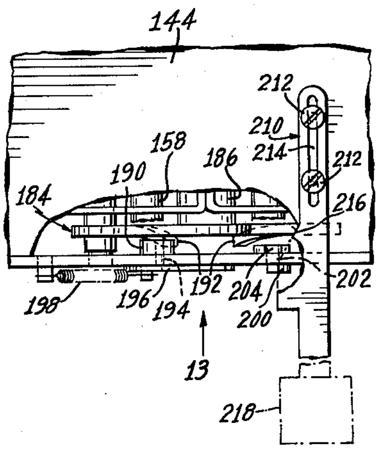
Figure 11:
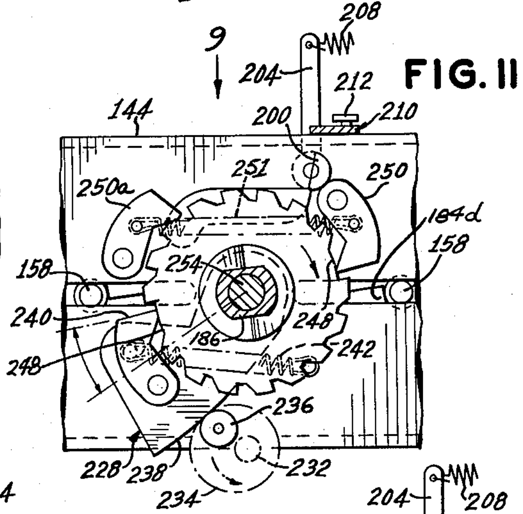
Figure 13:
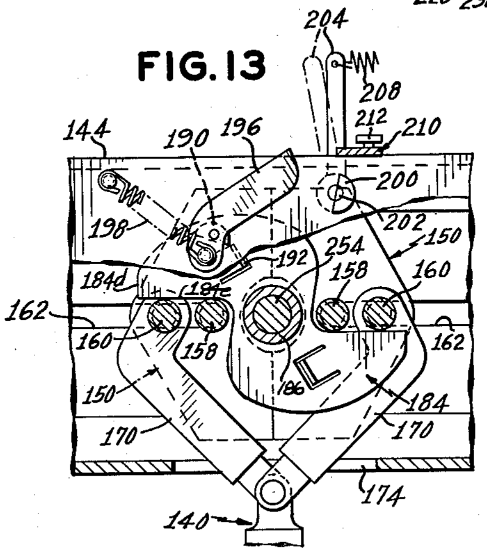
Figure 12:
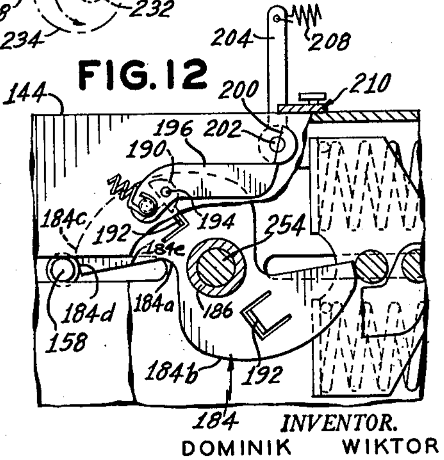

FIG. 4*a* is a fragmentary view similar to FIG. 4 but on a greatly enlarged scale;

FIG. 5 is a fragmentary front elevation, partially in section, along the line 5—5 of FIG. 3, of the spring-closing mechanism for operating the circuit breaker;

FIG. 6 is a view similar to FIG. 5 showing the operating springs in their fully charged condition;

FIG. 7 is a fragmentary plan view of the left-hand side of the mechanism shown in FIG. 6;

FIG. 8 is a front elevation of certain portions of the tripping mechanism as represented by the line 8—8 of FIG. 3;

FIG. 9 is a fragmentary plan view of a portion of the manual release mechanism for operating the spring closing mechanism in FIGS. 5 and 6 to close the circuit breaker;

FIG. 10 is a fragmentary elevation along the line 10—10 of FIG. 4, the spring operating mechanism being completely discharged;

FIG. 11 is a view similar to FIG. 10 with the parts shown in the positions which they assume when the spring closing mechanism has been fully charged;

FIG. 12 is a fragmentary view with portions of the spring closing mechanism viewed from a plane parallel to but to the rear of that from which FIG. 11 is taken, the spring mechanism being shown fully charged; and, FIG. 13 is a view similar to FIG. 12 with their parts in the positions assumed immediately after release of the spring mechanism to close the circuit breaker.

The circuit breaker shown in the drawings includes sets of companion contacts for interrupting a three-phase circuit. Also included is a trip-free quick-made quick-break contact operating mechanism. The energy for the contact closing operation is provided by energy storage springs coupled to a mechanism which, when released, operates the contact closing linkage. The spring mechanism, which is independent of the contact closing linkage, may be recharged immediately after the contact closing operation of the linkage. Manual and motor operated drive means are employed to provide energy for charging the springs.

Referring to FIG. 3, there is shown an insulator 20 having rearwardly extending terminals 22 and 24 rigidly anchored therein. This structure is repeated for each pole. Two-turn coil 26, a part of an over-current sensing device 27, is connected between terminal 24 and stationary hinge contact element 28 that is fixed to insulator 20. Main movable contact arm member 30 which has a U-shaped formation that opens downward to the left in FIG. 3, encircles transverse bar 32 that bridges the two legs of hinge element 28.

Figure 2:
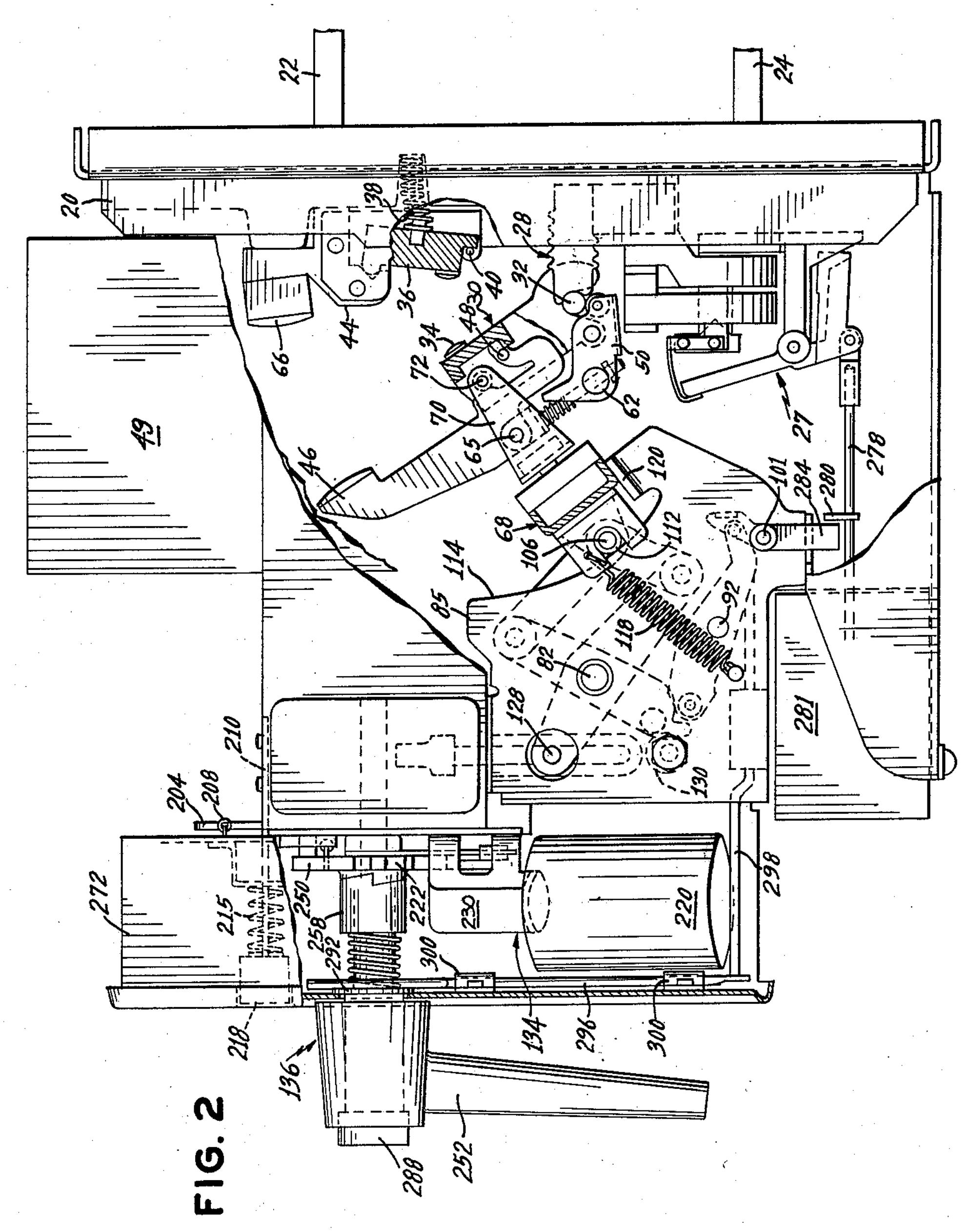
FIG. 2 is a side elevation of the apparatus in FIG. 1, certain parts being broken away to reveal portions of the internal mechanism.

Each main contact arm 30 carries a main contact 34 that engages a companion contact carried by the so-called stationary contact member 36. A powerful compression spring 38 biases the contact 36 against main contact 34 in the breaker closed position. Contact element 36 is capable of movement through a limited arc toward the front of the circuit breaker, which movement occurs when the circuit breaker opens. The extent of this movement is shown in FIG. 2, the forward swing being limited by pin 40. Spring 38 at all times maintains the firm electrical connection between stationary contact element 36 and pivot channel 42 of stationary conductor 44 that is joined to the end of terminal 22. There are a plurality of contact elements 36 and springs 38 arranged in side-by-side alignment for each pole so that multiple contacts with each main contact 34 are assured.

At each pole of the circuit breaker there are two arcing contact members 46 and an intermediate spacer 47. The arcing contacts pivot ta 48 on the main contact arm 30 for that pole and extend into a respective arc chute 49. Lever 50, pivoted to contact arm 30 at a pivot 52, carries a pressure roller 54 that bears against shaft 32. Compression springs 56 between arm 30 and lever 52 insure firm contact pressure of arm 30 against transverse hinge pin 32 forming part of the hinge contact 28. Compression springs 58 are provided on each guide rod 60 and apply counter-clockwise pressure to rod 62 which is rotatably united by lever 50. The upward reaction pressure developed by spring 58 is transmitted by a shoe 64 through pin 65 to the arcing contact member 46. When the circuit breaker is in the closed condition as illustrated in FIG. 3, the counter-clockwise spring bias against lever 50 as applied by the compression springs 56 is augmented by the pressure of the springs 58 as described. Stationary arcing contact 66 for each arcing contact 46 is mounted on member 44 and is thereby connected to terminal 22. The hereinbefore described contact structure is more fully set forth in my concurrently filed copending application Serial No. 89,977 filed February 17, 1961 and assigned to the same assignee as the present invention.

Each of the main movable contact arms 30 is joined to a common operating bar 68 by means of a shoe 70 pivotally secured to the contact arm 30 by a pin 72. The bar 68 and shoes 70 form a driving link. Shoe 70 may be described as being generally U-shaped, having legs of diminishing width. Referring to FIG. 3, shoe 70 is attached to the common operating bar or tie bar 68 by bolt 74 which is embedded in an insulating block 76, individual to each pole. Bolt 74 is threaded into shoe 70 and carries lock nut 78. The relationship between the common tie bar 68 and the contact pressure developed at each pole is adjusted by rotating each block 76 before it is confined by the channel-shaped tie bar 68 so as to provide the desired contact pressure at each of the poles when the blocks are fastened to the tie bar by screws (not shown). The contact arms 30 are mechanically connected by the tie bar 68 but electrically isolated by the blocks 76.

*Operating Linkage*

The operating linkage for the illustrative circuit breaker includes a plurality of pivoted levers which, together with the tie bar 68, form a toggle mechanism providing quick-make and quick-break of the companion contacts. Trip means responsive to circuit conditions and the like are provided to releasably support the toggle. Referring to FIGS. 2, 3, 4 and 4*a*, latch lever 80 is pivoted intermediate its ends on shaft 82 supported by the bifurcated breaker frame 84. Frame 84 is provided with a pair of spaced parallel legs 85. The lower end of the latch lever 80 is notched at 86 and also has a cam surface 87 formed adjacent the notch. Roller 88 carried by the latch prop 90 enters the notch 86 in the latched position. Latch prop 90 comprises a pair of spaced parallel plates which are tied together at one end by the roller 88 and are adapted to receive the latch lever 80 therebetween in the "tripped" position of the mechanism. Roller 88 engages the notch 86 which has its surface inclined so that in the engaged position there is a force component which urges the roller out of the notch. Latch prop 90, pivoted on pin 92, is biased into a latch lever engaging position by springs 94. Opposed projections 96 on the latch lever 80 engage the upper edges of latch prop 90 and, as will be more fully explained, prevent the prop from relatching until certain predetermined conditions have been fulfilled. The other end of the latch prop 90 carries a second roller 98 which engages a latch lock 100 secured to shaft 101. Shaft 101 extends out-board the legs 85 of the frame 84. Latch lock return spring 102 biases the latch lock to a latch prop engaging position.

The upper end of latch lever 80 carries a pivot pin 103 and is interposed between a pair of spaced intermediate links 104 pivoted at one end on pin 103. The other end of the first intermediate links 104 pivot on shaft 106 carried by brackets 108 secured to the tie bar 68. Links 104 and the tie bar 68 form a toggle indicated generally by reference character 110, and may therefore also be designated "toggle links." The knee of the toggle is shaft 106 and the "toggle links" are pivoted at pin 103 and at the plural pins 72, respectively. Pin 103 forms a trip-free reaction point for the toggle.

A pair of outboard rollers 112 fabricated from resilient material, such a nylon, are rotatably mounted on shaft 106. The rollers 112 cooperate with cam edges or flanges 114 of the frame legs 85, during the breaker opening and resetting operations, to guide the tie bar 68. The cams 114 are curvilinear and are arcs generated by a radius having its center coaxial with the pins 72 in the breaker open portion. Tension springs 118 assist in collapsing the linkage thus causing the breaker to open and urge the rollers 112 against the cams 114. Stops 120 on the frame legs 85 limit the downward movement of the bar 68.

The toggle 110 is "erected" to close the companion contacts 34, 36 through connecting link 122 and an operator lever 124. The operator lever 124 comprises a pair of spaced apart levers which are tied together and pass on either side of the latch lever 80. The operator lever is pivoted intermediate its ends on shaft 82 which also acts as a pivot for the latch lever 80. The two levers are crossed at their pivot. Connecting link or second intermediate 122 is also interposed between the ends of the operator lever segments and pivots on pin 126. It is pivoted at the other end on shaft 106 supported by the tie bar 68. Thrust pin 128 is affixed to the operator lever 124. The amount of overcentering of the toggle 110 is controlled by an adjustable eccentric 130 affixed to the frame. The eccentric acts as a stop to limit the movement of the operator lever 124 in the toggle erecting direction.

*Closing Mechanism*

A considerable amount of energy, quickly applied, is required to produce the quick-make quick-break closing operation of the companion contacts 34, 36. A portion of the energy required is expended, at the end of the closing stroke, to erect the toggle 110 against the force of the contact biasing springs 38. These biasing springs supply the impetus for quickly opening the breaker. Energy is also required to overcome the electrodynamic forces generated when the contacts first close. In order to provide the required amount of energy in a short period of time and with minimum space requirements, an energy accumulator or stored energy mechanism 132 is provided. The mechanism 132 includes power driven charging means 134, manually operable charging means 136, energy storage means 138, and coupling means 140 connected between the stored energy mechanism 132 and the operator lever 124 of the breaker linkage. The stored energy mechanism 132 is discharged on command to close the breaker.

*Energy Storage Means*

The energy for closing the breaker is stored in opposed pairs of compression springs 142 contained within a housing 144 affixed to the frame 84. Each of the energy storage springs 142 is positioned about a guide rod 146 secured to housing end cap 148. The springs 142 react between the end cap 148 and pistons 150 slidable within the housing. Each of the pistons 150 is U-shaped, having a bight portion 152 and upstanding legs 154. The bight portion is divided into two by a cutout 156 provided for clearance purposes. Each piston 150 has inner 158 and outer 160 guide pins secured thereto. The travel of the pins and pistons is constrained by slots 162 in the housing 144. Referring to FIGS. 6 and 7, outer guide pin 160 of left hand piston 150 has an extension 164 that operates a limit switch 166 for purposes which will be set forth in detail later.

Energy which has been accumulated in the springs 142, is delivered, when the springs are discharged, through a thrust link 168 to pin 128 secured to the operator lever 124. The U-shaped pistons 150, against which the springs react, are coupled to the thrust link 168 by pairs of opposed links or levers 170. Links 170 are pivoted on the outer guide pins 160 between the pistons and the housing wall on each side of the pistons. The links are joined together at 172 to the thrust link and form a toggle. Thrust link 168 and toggle links 170 pass through an opening 174 in the housing 144. When the springs are fully compressed, the link toggle is erected. When the accumulator is discharged the pistons 150 are driven toward one another and the link toggle is collapsed. When the toggle is approaching its fully collapsed position, maximum thrust is transmitted to link 168 due to the lever action of the toggle links. In this way the increased energy required at the end of the closing stroke is provided.

Springs 142 while "discharged" are nonetheless strongly biased against the pistons 150 which abut one another. The opposed pairs of springs 142 and pistons 150 are dynamically and statically balanced in that the force contained within the springs is delivered equally to the links 170.

Thrust link 168 includes the block 176 to which the links 170 are joined and to which shaft 178 is adjustably secured. Thrust transmitting member 180, secured to shaft 178, is provided with a slot 182 to accommodate pin 128 of the operator lever 124. Slot 182 is wide enough to allow for movement between the pin 128 and thrust link 168 when the lever 124 pivots as the link 168 is reciprocated. During the closing operation the pin 128 is moved downwardly by the end of the slot 182 until the toggle 110 passes over-center. The end of the lever 124 is then driven against the stop 130 by the force of the springs, 38, 118 which urge the toggle to collapse.

Referring to the drawings, a pair of double lobe edge cams 184 are secured to hollow shaft 186, supported by bearings 188, within the housing 144. The innermost piston guide pins 158 are forced against the edge of the cams by the opposed pairs of springs 142 pushing against the pistons 150. Since the springs 142 are the same and are applied to opposed sides of the cam, there is little or no strain on the shaft 186. Absence of unbalanced stresses reduces the friction which retards the speed of operation. Each lobe of each cam 184 (see FIGS. 5, 6, 12 and 13) has a low point 184*a*, positive angle segment 184*b*, high point 184*c*, negative angle segment 184*d* and a sharp drop-off radially aligned segment 184*e*. Rotation of the cams 184 from their discharged position shown in FIGS. 5 and 13 to the charge position shown in FIGS. 6 and 12 causes the pistons 150 to move away from their abutting position, against the force of the storage springs 142. Rotation of the cams, by either the power charging mechanism 134 or manual charging mechanism 136, is stopped when the pins 158 have traversed the periphery of the cam from the low point 184*a* through the positive angle segment 184*b* past the high point 184*c* and into the negative angle segment 184*d*. The force of the compressed storage springs 142 pressing the pins 158 against the cams makes the cams 184 rotate, independent of the charging mechanisms 134, 136, once the pins 158 are on the negative angle segment 184*d* of the cam periphery. However, the cams 184 are locked against the continued movement in the discharging direction by a spring loaded pivotal stop 190 which engages a complementary struck-up projection 192 on one of the cams (FIG. 12, 13). Stop 190 is mounted on a shaft 194 within the housing 144. Shaft 194 extends through, and is pivotally mounted in, the wall of the housing. Bell crank 196 is affixed to the external end of shaft 194 and tension spring 198 extends between the short end of the crank 196 and the housing 144. The long end of the crank is releasably engaged by a pivotal stop 200 affixed to shaft 202 which extends through and is pivoted on the housing wall. Lever 204, mounted on shaft 202 inside the housing, extends to the exterior through slot 206 (see FIG. 9). Lever 204 is maintained in its erect position by tension spring 208. Pivotal movement of lever 204 and shaft 202 is caused by a slide 210 (see FIG. 9) which is secured to the housing by two screws 212 passing through a slot 214 in the slide. Slide return spring 215 is positioned about the slide and reacts against the housing 144. The contoured segment 216 of slide 210 contacts the lever 204, as best seen in FIG. 9, so that the lever is pivoted when the slide is moved inwardly. Knob 218 is affixed to the end of the slide and protrudes from housing 144 to a position where it is accessible to the operator.

*Power-Driven Charging Mechanism*

The power driven charging mechanism 134 supplies the energy for compressing the storage springs 142. Included is a motor 220, in this case electrically operated, coupled to a ratchet wheel 222 having its hub 224 secured to the end of hollow shaft 186 (which also carries the double lobed charging cams 184) outside of the housing 144. The hug 224 has two diametrically opposed teeth cut into its external face 225 forming half of uni-directionally operable over-running clutch 226. Shaft 186 also serves as a bearing surface for the angularly reciprocated driving member 228 which is pivoted on the shaft between the ratchet wheel 222 and the wall of the housing 144. Charging motor 220 has an integral reduction gear train 230 having an output shaft 232 transverse to the longitudinal axis of the motor. An eccentric drive cam 234 is secured to the output shaft 232 and has a roller 236 rotatably secured thereto in an offset position (see FIGS. 10, 11).

The driving member 228 is provided with a curvilinear bearing or cam surface 238 which is contacted by the roller 236 when the eccentric cam 234 is rotated by the motor 220. A driving pawl 240 is mounted on the driving member 228 and engages the toothed periphery of the ratchet wheel for driving the wheel in only one direction, clockwise as seen in FIGS. 10 and 11. Drive pawl 240 is urged into engagement with the wheel in one direction, by bias spring 242 connected between the housing 144 and a pin 244, secured to the pawl, which passes through slot 246 in the drive member 228. Spring 242 also returns the drive member 228 to its initial position after each oscillation. The periphery of the ratchet wheel 222 has certain teeth removed therefrom forming flats 248, at points corresponding to the fully charged position of the storage springs 142. This allows the drive motor 220 to overrun the fully charged position of the storage springs, without prematurely discharging the springs, by making the pawl 242 unable to advance the ratchet wheel 222 because it drives against the toothless section 248 of the ratchet wheel periphery.

The ratchet wheel 222 is indexed a tooth at a time for each revolution of the eccentric driving cam 234. The wheel is allowed to move in the charging direction only by retaining pawls 250—**250*a* pivoted on the housing 144 and interconnected by a tension spring 252. Drive motor 220 is under load during that portion of the rotation of the dirve cam 234 wherein the cam is in contact with the driving member 228**. While the motor is slowed somewhat under heavily loaded conditions, the no-load portion of the rotation of the cam allows it to build up to its no-load speed with consequent beneficial increase in momentum.

*Manual Charging Mechanism*

Adverting to FIGS. 3 and 4, the manual storage spring cocking means 136 includes a handle 252 secured to one end **254*a* of shaft 254 by a screw 256. Shaft 254 has a central segment 254*b* with a larger diameter. The other end 254*c* of the shaft is rotatably carried by the hollow shaft 186 previously described. An overrunning clutch segment 258, having a pair of diametrically opposed teeth complementary to the teeth of the clutch segment 225 formed on the hub of the ratchet wheel 222, is secured to the larger diameter portion 254*b* of the shaft by pin 260 which passes through slots 262 in the segment. The overrunning clutch 226 thus formed couples the handle 252 to the ratchet wheel 222 for manually charging the storage springs 142 when the handle is rotated in the charging direction. When the motor 220 is used, the handle is independent of one charging mechanism and does not rotate while the clutch 226 slips. Also, the storage springs 142 may discharge without moving the handle. The clutch segments 258, 225 are urged into engagement by spring 264 positioned about the shaft segment 254*b*. The handle 252 is returned to the position shown in FIG. 1 by a torsion spring 266 reacting between a stop 268 on the housing 144 and a cap 270 secured to the shaft end 254*c*. The cap 270 operates with frame mounted stops 271 (one of which is shown in FIG. 3) to limit the rotation of the shaft 254 and handle 252. The charging mechanisms, manual 136 and power driven 134, are enclosed within a protective enclosure 272 secured to the housing 144** by conventional means.

*Breaker Tripping Mechanism*

Latch lock 100 is secured to a shaft 101 rotatably supported by the breaker frame 84. The ends of the shaft 101 extend beyond the legs 85 of the frame. Each of the poles may be provided with a device, responsive to the circuit conditions in the corresponding phase, which is operatively connected to the latch lock 100 by means of the shaft 101. For example, over-current tripping means 27 as shown in the drawings, may be employed. Additionally, under-voltage detection and tripping means may also be employed, in place of, or addition to, over-current sensitive devices. In the embodiment illustrated, the two turn coil 26 surrounds and is insulated from a portion of a magnetic structure 274 which is affixed to the insulating block 20. Current flowing through the coil 26 generates a magnetic field which atracts an armature 276 pivoted on the frame 274. The armature 276 is pivotally connected to a rod 278 that carries an adjustable stop 280. Rod 278 is connected to the armature at one end and to a time delay mechanism 281 at the other. When the current flowing through the coil 26 exceeds a pre-determined level for a prescribed time the armature causes the stop 280 to rotate the shaft 101 and thereby causing the latch lock 100 to release the latch prop 90 (see FIG. 3). In the case of the center pole of the apparatus (FIG. 3) the stop bears against the lower end 282 of the latch lock 100. In each of the outboard poles (FIG. 2), the stop 280 bears against an arm 284 secured to the shaft 101. Additional tripping means, as previously described, may be added to the apparatus being operatively connected to the latch shaft 101.

Figure 1:
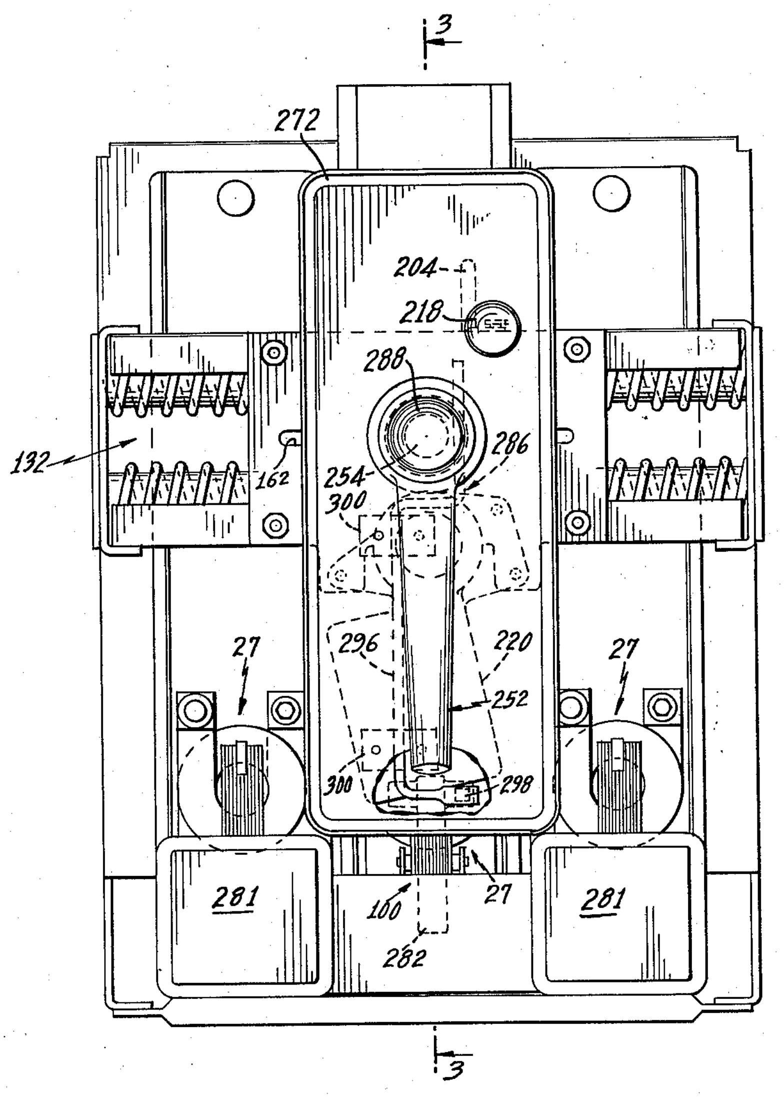
FIG. 1 is the front elevation, drawn to a reduced scale, of the circuit breaker embodying the various features of novelty.

Manually tripping means 286 for opening the breaker contacts are also provided. Referring to FIGS. 1, 2 and 4, a manual trip button 288, coaxial with the shaft 254, is slidable within a recess 290 in the handle 252. The button is connected to a plate 292 slidable along shaft 254, within the enclosure 272, by rods 294. The previously described over-running clutch spring 264, positioned about the shaft 254, reacts between the clutch segment 258 and the plate 292 to bias the button 288 outwardly as seen in FIG. 4. A vertical transfer lever 296 connects the plate 292 and a horizontal actuator rod 298. One end of the transfer lever 296 contacts the plate 292 and the other end of the lever, which is flattened, abuts the end of the actuator rod 298. The transfer lever is hinged at 300 to the enclosure 272. Actuator rod 298 is supported for axial movement by a housing 302 secured to the breaker frame 84 (FIG. 4). Bias spring 304 urges the rod 298 into engagement with the transfer lever 296 and away from an extension 306 of the latch lock 100 (FIG. 8). When the manual trip button 288 is pressed inwardly the plate 292 pivots the transfer lever 296 causing the actuator rod 298 to push against the latch lock 100 until the bias of the return springs 102, 264, 302 is overcome and the latch lock 100 releases the latch prop 90 to open the breaker contacts in a manner to be hereinafter described in detail.

*Operation*

The illustrative embodiment of the invention may be best understood with the assistance of a description of its operation beginning with the companion contacts open and the stored energy closing mechanism discharged. Referring to FIGS. 10 and 11, when electrical power is available the motor 220 is used to charge the energy storage mechanism. The motor drives gear train 230 to cause rotation of output shaft 232 and eccentric drive cam 234 in a counterclockwise direction as indicated by the arrows. As the drive cam 234 rotates the roller 236 repeatedly urges the drive member 228 upwardly against the bias of spring 242 causing it to oscillate about shaft 186. One cycle of oscillation is produced for each rotation of the output shaft 232. The length of the oscillatory path of drive member 228 about shaft 186 is greater than the length of one tooth measured along the periphery of the ratchet wheel 222 as can be seen in FIG. 11. Driving pawl 240 engages individual teeth of the ratchet and moves the ratchet wheel in the spring charging direction as the drive member is oscillated. Retaining pawls 250, **250*a* prevent the wheel from dropping back after it has been advanced one tooth by the driving pawl. The advance of the ratchet wheel continues until the springs 142 are fully charged at which time the flat 248 comes beneath the driving pawl which is disengaged thereby. Since the driving pawl does not advance the wheel 222**, it is possible for the motor to continue to operate without changing the position of the ratchet wheel.

In FIG. 11 it will be observed that driving pawl 240 is in cooperation with one of the flats 248. At such times, pawl 240 reciprocates idly without driving ratchet 222 and that the ratchet does not move reversely as the driving pawl withdraws preparatory to a driving stroke. This is because cam follower 158 bears against the negative-angle portion **184*d* of the cam. At this time, the cam tends to be driven forward by the spring bias on the cam follower that bears against cam portion 184*d*. This is prevented by the latching mechanism shown in FIG. 12. For this reason, detent pawls 250 and 250*a* are not relied upon to prevent reverse rotation of the ratchet wheel in the fully charged condition of the mechanism. At all other times these detents are needed to prevent reverse-rotation of the ratchet between driving strokes of driving pawl 240**.

In the arrangement shown, pawl 250 rests on one of the flats 248 when the driving pawl 240 reciprocates along the opposite flat 248. This particular relationship is not always feasible. In cases where the driving pawl is not diametrically opposite a detent pawl, it is important that a pair of pawls are used, spaced apart by an angle that differs from the angle between the flats 248. This will be understood from the following.

During the normal reciprocating strokes of driving pawl 240 when it advances the ratchet stepwise and engages successive teeth of the ratchet, a detent pawl must be effective between drive strokes to prevent reverse rotation of the ratchet. This is to enable the driving pawl to withdraw preparatory to its next driving stroke. If only one detent pawl were used (pawl **250*a* alone, for example) then that detent pawl might be in cooperation with a flat 248** and would be ineffective to prevent reverse rotation of the ratchet as the driving pawl withdraws after a driving stroke. Under such circumstances a single detent pawl would disable the driving pawl from advancing the ratchet through the full sequence of charging strokes required. However, by employing two detent pawls spaced apart by an angle that differs from the angular separation between the flats, assurance is provided that one of the two detent pawls will always be active despite the possibility of the other detent pawl resting on a flat.

In the arrangement shown, detent pawl **250*a* could be omitted, since detent pawl 250 rests on a flat 248 only when the cam follower 158 bears against a negative cam portion 184*d***. At such times, the ratchet tends to rotate in its forward direction and needs no detent that would function only to prevent reverse rotation of the ratchet.

The charging cams 184 are fixed to shaft 186 and move the storage springs 142 from their discharged position shown in FIG. 5 toward their fully charged position shown in FIG. 6. The energy of the charging source is transmitted to the springs from the cams by the piston guide pins 158 as they ride along the positive angle segment **184*b* of the periphery of the cam. After the high point 184*c* of the cam is passed, during the charging operation, the pins 158 are then on the negative angle segment 184*d* and a slight amount of expansion of the springs is allowed toward their discharged position as the pins retreat. This movement, which is less than 10° of arc, toward the discharged condition of the springs is arrested when a releasable stop 190 engages a complementary projection 192 on the face of the cam 184. Releasable stop 190 is biased into engagement with the projection 192 by spring 198 and it is latched in the projection engaging position by a second pivotally mounted stop 202. Extension 164 of pin 160 carried by the left hand piston 150 (as viewed in FIGS. 6 and 7) contacts the plunger of limit switch 166 to deenergize charging motor 220 when the springs have reached their fully charged position. The driving pawl 240 is on the ratchet wheel flat 248** at this point.

When the pistons 150 are moved from their discharged position shown in FIG. 5 to the charged position shown in FIG. 6 the secondary toggle links 170 forming a part of the thrust or energy distributing mechanism 140 are drawn up into the housing 144. The links are each pivoted on piston carried pins 160 and have their other end connected to a common pivot block 176 forming the knee 172 of the toggle. As the links move up into the housing, through slot 162, the thrust link 168 is also drawn upwardly. Slot 182, formed in the thrust link 168, allows relative movement between the link 168 and the pin 128 at the end of operating lever 124.

Latch prop 90, when held in position by latch lock 100, prohibits counterclockwise rotation of the latch lever 80 about its pivot shaft 82 and therefore pin 103 carried by the latch lever 80 may be considered a relatively fixed pivot point for the main toggle 110. Depressing close button 218 causes slide 210 to rock the stop 204 and cause release of the cam 184. The force of the springs 142 on the negative angle segment **184*d* of the cam edge causes cam 184 to rotate rapidly independent of the charging mechanism. Only a slight amount of rotation, of the order of 5°, is required before the pins slide off the negative angle segment 184*d* to the rapid drop off section 184*e*. When the pins 158 are free of the cam 184 the entire force of the springs 142 is on the links 170 through the pistons 150 and pins 160. The pistons 150 are driven toward one another rapidly, without any drag attributable to the charging mechanism, causing the links 170 to drive the thrust link 168 downwardly against the pin 128 on the operator lever 124. The operator lever 124 rocks counterclockwise about shaft 82 in response to the force applied to pin 128. The other end of lever 124 is attached by connecting link 122 to the shaft 106 forming a knee of the main toggle 110 (FIG. 3). Second link 104 which extends between the knee of the toggle 110 and pin 103 on the latch lever 80 is pivoted about pin 103 as the lever 124 rocks in response to the applied thrust. Links 104, 122, operating lever 124 and latch lever 80 form a parallelogram. In this parallelogram, one set of levers is used to close the breaker and the other set is immobile. The reverse is true in the opening operation as will be explained. An advantage of this lever system is that the number, and the consequent increased mass of the moving parts is reduced. The pivotal movement of second link 104 is reflected in the movement of the tie bar 68 which together with the second link forms the main toggle 110. The described linkage provides a direct positive drive connection between the stored energy mechanism and the contact arms in the contact closing operation. Toggle pivot 103 on latch lever 80 is retained in position by the latch prop 90 which is, in turn, held stationary by the latch lock 100 against the forces transmitted through the linkage when the toggle 110 is erected. The toggle 110 is erected by the movement of the operator lever 124**.

As the main toggle 110 is erected each of the contact arms 30 pivots, simultaneously, about its hinge 28. Contact pressure is built up between the arcing contacts 46, 66 by the springs 58 and between the primary companion contacts 34, 36 by the contact springs 38. The compression of the springs occurs near the end of the stroke of the thrust link 168 and therefore requires an increase in the applied force over that required to merely pivot the members to the contact touching position against the force of the return springs 118. The increased force at the end of the stroke is provided through the lever advantage obtained from the use of opposed links 170 in the secondary toggle formation. As is well known in the art maximum lever advantage is obtained from a toggle when it nears its fully collapsed condition.

The main toggle 110 is driven over-center in the erecting direction with the knee 106 of the toggle passing over an imaginary line drawn between pivots 103 and 72. It is arrested in the over-center contacts closed position by the adjustable eccentric stop 130 that engages the driven end of the operator lever 124 (FIGS. 3, 6). The energy storage mechanism 138 is returned to its charged condition by motor 220 which is energized, when the springs are discharged, by the limit switch 166.

*Manual Charging Mechanism Operation*

The energy storage mechanism 138 may be charged manually as an alternative to the use of the electric motor 220. Referring now to FIGS. 1 and 3, the handle 252 is rotated, counterclockwise, approximately 90° until the end cap 270 on shaft 254 counters stop 271. At this point the teeth on clutch segment 258 snap into engagement with the complementary teeth formed on the face 225 of the ratchet wheel 224. The handle is then rotated approximately 170° in the clockwise direction and, through the uni-directional clutch 226, the storage springs 142 are cocked by concomitant rotation of the cams 184. In the last few degrees of rotation of the handle 252, before the end cap 270 abuts the stop 271 (not shown) the pins 158 riding on the charging cams 184 move into the negative angle segment 184*d* of the cams as in the case of the motor driven charging cycle. The cams 184 are then latched in the charged position by the previously described stop mechanism. Torsion spring 266 returns the handle to the center position shown in FIG. 1 when the handle is released. Manual over-charging of the stored energy mechanism is prevented by the stops 271 which limit the handle movement to somewhat less than 180°. The charged position of the ratchet wheel 222 is such that the clutch teeth formed on the hub 224 are stopped, when the cams 184 are latched, at a position beyond the range of angular movement permitted the handle 252 by the stops 271. Since the two teeth of the clutch 226 are diametrically opposed it would require a handle movement of at least 180° to reengage the clutch segments. Therefore manual over-charging is not possible whether the original charge placed upon the storage springs 142 was due to the operation of the motor 220 or the handle mechanism 252.

*Breaker Opening Operation*

Considering now the operation of the linkage mechanism during the opening operation with the energy storage mechanism 138 recharged. Rotation of the latch lock shaft 101 when caused by either a circuit condition responsive device such as the overcurrent relay 27 or by the manual release button 288 and associated linkages has the same result. When shaft 101 is rotated in a clockwise direction as viewed in FIG. 3 latch lock 100 releases roller 98, carried by the latch prop 90. The toggle linkage is subjected to a considerable force from the contact biasing springs 38 which tends to cause the toggle to collapse by rotating latch lever 80 about its pivot 82 in the counterclockwise direction. The force applied to the pivot 103 of the toggle 110 is transmitted to the latch prop 90 by the latch lever 80 which engages the end of the roller 88 at the end of the prop 90. When the latch lock 100 releases the roller 98 at the other end of the latch prop 90, the prop is then free to be rotated counterclockwise about its pivot 92. The latched end of lever 80 has a surface which forms an acute angle with a line between pivot 92 and roller 88 tending to bias latch prop 90 in the unlatching direction. Latch prop 90 pivots out of engagement with the latch lever 80 and the latch lever is free to rotate about its pivot point 82. Rotation of the latch lever 80 raises the toggle pivot 103 above its previous position in effect causing knee 106 of the toggle 110 to be passed under-center of an imaginary line extending between the pivots 103 and 72. The rapid collapse of the toggle 110 occurs after it passes under-center, the force exerted by the contact biasing springs 38 causes the latch lever 80 to pivot about its axis, drawing the contact arm 30 back sharply. During this portion of the opening operation inertia maintains the operator lever 124 steady.

Collapse of the toggle 110 results first in the separation of the main contacts 34, 36 as the contact arms 30 are pivoted on their hinge elements 28, subsequently the arcing contacts 46, 66 separate. The extent of the separation between the contacts is controlled by the extent of movement of the tie bar 68. Maximum separation between the contacts is achieved when the rollers 112 contact the frame 84. The rollers 112, carried by pivot shaft 106, are drawn against the curvilinear flanges 114 of the frame legs 85. The return springs 118 keep the rollers 112 from rebounding and also pivot the tie bar 68 about the pins 72 while the rollers 112 follow the curve of the cam edges or flanges 114 until the bar 68 comes in contact with the stops 120. Since the curve of the cam edges 114, as previously described, corresponds to an arc swung about the common pivot points 72 of the operating bar 68 in the contact open position no further motion of the main contact arm 30 about hinge 28 occurs once the rollers 112 have encountered the flanges 114. The rollers 112 are fabricated from resilient material such as nylon or Teflon and absorb the energy of the moving parts, thus preventing rebound and possible restrike of the arc between the contacts while opening under load.

When the latch lever 80 is pivoted about shaft 82, the cam end 87 of the lever rides over the roller 88 and enters the space between the halves of the latch prop 90. Restoring spring 94 urges the latch prop 90 upwardly to reengage the latch lock 100 once the force from the contact springs 38 has been released by the movement of the latch lever 80. However, the projections 96 on the latch lever 80 push against the upper edges of the halves of the prop 90 and cause the prop to remain depressed after the end 87 of the lever enters therebetween. In this way the prop carried roller 88 is prevented from stopping the latch lever when it is moved in the resetting direction. The cam edge 87 on the lever depresses the roller 88 during the re-latching phase. As the tie bar 68 pivots about pins 72 the rollers 112 roll down the flanges 114 of the frame 84 under the influence of the return spring 118 and the latch lever 80 is pivoted about shaft 82 to its original position with the notch 86 engaging the roller 88. During the movement of bar 68 along the flanges 114 of the frame subsequent to the full opening of the contacts, the operator lever 124 also pivots about shaft 82 from its position against the eccentric stop 130 to "breaker-open" position shown in FIG. 2. Contact separation is produced without requiring any movement of the operator lever 124. Therefore, even if the storage springs 142 have not been re-charged and the thrust link 168 is still extended, the breaker may open.

*Trip-Free Operation*

If the breaker should be closed against a severe overload the trip-free feature of the circuit breaker becomes operative. The breaker may be opened at any part of the closing cycle by rotation of the latch shaft 101, since the tripping mechanism is independent of the closing mechanism. If desired, the shaft may be locked out so that the stored energy means 132 may be discharged without moving the contacts. This is particularly important in testing the breakers. In the present embodiment the current flowing through the arcing contacts 46, 66, which are the first to close causes the circuit protective device 27 to operate. However, the closing speed is so high that the main contacts close forcibly despite the flow of short circuit current through the protective device 27. Operation of over-current sensing device 27 causes the latch lock 100 to release latch prop 90. Thrust link 168, until withdrawn by the charging operation, acts as a stop to the clockwise rotation of the operator lever 124 about pivot 82. The release of latch prop 90, even though operator lever 124 is held by thrust link 168, allows the breaker to open under the influence of the springs 38 and 118. Normal separation of the contacts is achieved because the latch prop 90 is free to rock about its pivot 82 until the rollers 112 contact the flanges. As previously described in detail the configuration of the flanges is developed from an arc swung about the pivots 72 when the breaker is in the open contact position. As the charging mechanism draws the thrust link upward the operator lever 124 rocks about shaft 82 allowing the rollers 112 to descend along the flanges 114 until the tie bar 68 contacts stop 120 and relatching of the latch prop occurs.

The circuit breaker shown in the drawings and described in detail above is one which is particularly well suited to circuits in which short-circuit currents of relatively high values are encountered. The operating mechanism is particularly effective in closing the contacts at high speed and with firm closing effort. Such closing action is desirable for avoiding damage to the contacts that might otherwise occur on occasions when the circuit breaker is closed against high fault currents. The operating mechanism achieves these characteristics and at the same time provides fast response to fault currents, in effecting automatic opening of the contacts. The nature of the mechanism is such that its parts can be and are of low mass and low inertia, so that fast automatic opening operation is achieved. This results in improved current-interruption characteristics.

The spring energy-storage mechanism that drives the contacts closed in the embodiment described is of relatively modest structural proportions, and it is of relatively light-weight construction. Nevertheless it combines the important characteristics of fast contact-closing operation with an unusually high level of contact-closing force at the end of the contact-closing stroke. This feature makes possible the use of firm contact-pressure springs for high contact pressures, and it overcomes electrodynamic blow-off forces that develop at the instant of initial contact engagement under short-circuit conditions.

Firm contact pressure is developed by drive of the contact arm 30 against companion contact 36. If short-circuit current should flow for an instant after the main contact engage (before the overload release linkage has become effective to free the contact arm opening), a heavy blow-off force develops that tends to drive contact arm 30 to the left in FIG. 3. At the same time, contact 36 is blown to the left and thus builds up the contact pressure between main contacts 34 and 36 above that pressure which would be produced solely by contact-pressure springs 38. These blow-on and blow-off forces result from the interaction of the magnetic fields due to the currents in terminals 22 and 24, contact 36 and contact arm 30.

The specific circuit-breaker mechanism shown and described has the desirable characteristics discussed generally above and it has certain additional inherent advantages. However, it will be apparent that modifications and varied rearrangement of the described mechanism will occur to those skilled in the art and consequently the invention in its various aspects should be construed broadly in accordance with its full spirit and scope.

What I claim is:

1. A circuit breaker having a pivoted contact arm, a companion contact engageable by said pivoted contact arm in the closed condition of the circuit breaker, a driving link having one end pivoted to said contact arm and having a cam follower at the opposite end thereof, a trip-free actuating and over-load release linkage connected to said driving link, a fixed cam engaged by said cam follower, said linkage when in various open-contact configurations causing said cam follower to move along said cam and said cam acting to establish the extent of opening of said pivoted contact arm, said trip-free actuating and over-load release linkage including a pair of crossed levers one of which is an operating lever and the other of which is a latch lever, a pair of connecting links pivoted to each other and to said driving link, said links also being pivoted to said crossed levers, respectively, a stored-energy drive mechanism coupled to said operating lever, a latch mechanism for normally arresting said latch lever, and means biasing said cam follower along said cam toward a position wherein said operating lever is at the starting end of said power stroke and said latch lever is in its restored position for coaction with said latching mechanism.

2. A circuit breaker including a movable contact structure and a companion contact engageable by the movable contact structure in the closed condition of the circuit breaker, and trip-free operating mechanism for said movable contact, said mechanism including a pair of crossed levers having a common fixed pivotal axis, a pair of connecting links pivoted to each other and to said movable contact structure at a common pivotal axis, said links also being pivoted to said crossed levers, respectively, a drive mechanism coupled to one of said crossed levers and operable in a power stroke to drive one of said connecting links in a direction to close the circuit breaker, and a latching mechanism for normally arresting the other of said crossed levers.

3. A circuit breaker including a movable contact structure and a companion contact engageable by the movable contact structure in the closed condition of the circuit breaker, and trip-free operating mechanism for said movable contact, said mechanism including a pair of crossed levers having a common fixed pivotal axis, a pair of connecting links pivoted to each other and to said movable contact structure at a common pivotal axis, said links also being pivoted to said crossed levers, respectively, a drive mechanism coupled to one of said crossed levers and operable in a power stroke to drive one of said connecting links in a direction to close the circuit breaker, and means biasing said mechanism into normal position, to wit, with said one of said crossed levers at the starting end of said power stroke and with said other of said levers restored for coaction with said latching mechanism.

4. A circuit breaker including a movable contact structure and a companion contact engageable by the movable contact structure in the closed condition of the circuit breaker, and trip-free operating mechanism for said movable contact, said mechanism including a pair of crossed levers having a common fixed pivotal axis, a pair of connecting links pivoted to each other and to said movable contact structure at a common pivotal axis, said links also being pivoted to said crossed levers, respectively, the length of each of said levers between its pivots being equal to the length between pivots of respective ones of said connecting links to form a parallelogram, a drive mechanism coupled to one of said crossed levers and operable in a power stroke to drive one of said connecting links in a direction to close the circuit breaker, and a latching mechanism for normally arresting the other of said crossed levers.

5. A circuit breaker including a movable contact structure and a companion contact engageable by the movable contact structure in the closed condition of the circuit breaker, and trip-free operating mechanism for said movable contact, said mechanism including a frame, a pair of levers pivoted on said frame, a pair of connecting links pivoted to each other and to said movable contact structure at a common pivotal axis, said links also being pivoted to said levers, respectively, a drive mechanism coupled to one of said levers and operable in a power stroke to drive one of said connecting links in a direction to close the circuit breaker, and a latching mechanism for normally arresting the other of said levers.

6. A multipole circuit breaker each pole of the circuit breaker being of the type having an insulation panel, a first rearwardly extending terminal passing through said panel, a contact resiliently mounted on said first terminal, a second rearwardly extending terminal passing through said panel, a contact carrying arm hinged to said second terminal, said contact arm being movable from a circuit closed position wherein said arms abuts said resiliently mounted contact to a circuit open position, and a shoe pivotally mounted on each of said arms intermediate the ends thereof, and said circuit breaker having a common insulated bar secured to and bridging all of said shoes, said circuit breaker having an improved trip-free operating mechanism comprising a frame, contact arm moving means including first and second crossed levers having a common pivotal mounting on said frame intermediate the ends of both said levers, a first intermediate link pivoted at its ends to said common bar and to one end of said first lever, respectively, whereby a toggle is formed including said shoes and said common bar as one element of the toggle, and said first intermediate link as the other element of the toggle, latch means mounted on said frame in cooperative relation with the other end of said first lever, a second intermediate link pivoted at its ends to said common bar and one end of said second lever, respectively, and toggle erecting means mounted on said frame and connected to the other end of said second lever.

7. A multipole circuit breaker having a movable contact arm for each pole, said arms being movable between an open circuit position and a closed circuit position and having coaxial pivots, a common insulated tie bar pivotally connected to each of said contact arms extending parallel to the pivots thereof, said tie bar having cam followers thereon spaced apart along the tie bar, said circuit breaker having an improved trip-free operating mechanism comprising a frame having a pair of cam elements spaced from each other along the tie bar for cooperation with the cam followers when the contact arms are in their "open" position, contact arm moving means including first and second crossed levers having a common pivotal mounting on said frame intermediate the ends of both of said levers, a first intermediate link pivoted at its ends to said common bar and to one end of said first lever, respectively, whereby a toggle is formed including said tie bar as one element of the toggle, and said first intermediate link as the other element of the toggle, latch means mounted on said frame in cooperative relation with the other end of said first lever, a second intermediate link pivoted at its ends to said tie bar and one end of said second lever, respectively, and toggle erecting means mounted on said frame and connected to the other end of said second lever.

8. A circuit breaker having a pivoted contact arm, a companion contact engageable by the pivoted contact arm in the closed condition of the circuit breaker, a driving link having one end connected by a pivot to said contact arm, a trip-free actuating and overload release mechanism connected to a portion of said driving link remote from said pivot, said trip-free mechanism including an overload release linkage pivoted to said remote portion of said driving link, an overload responsive device normally restraining said overload release linkage, an operating linkage pivoted to said remote portion of said driving link, and means for operating said operating linkage with driving thrust, said operating means having a one-way driving connection to said operating linkage and being freely retractable, said operating linkage and said overload release linkage acting conjointly during contact-closing operations to constrain said remote portion of said driving link, said driving link having a cam follower thereon remote from said pivot, spring biasing means acting on said driving link in the contact opening direction, and a fixed cam engageable by said cam follower when said trip-free mechanism is in any open-contact configuration, said cam acting to establish the extent of opening of said pivoted contact arm.

9. A circuit breaker having a movable contact arm and a companion contact, a driving link pivoted to said contact arm, a latch lever pivoted at a fixed axis intermediate its ends, a third link having respective pivotal connections to said latch lever and to said driving link and forming a toggle with said driving link when the latch lever is arrested, an operating lever having a fixed pivot on said axis, a connecting link having respective pivotal connections to said operating lever and to the pivotal connection between said third link and said driving link, latch means for releasably arresting said latch lever, and drive means operable to force said operating lever in the direction to erect said toggle and thereby to drive said contact arm toward said companion contact in a trip-free manner.

10. A circuit breaker including a movable contact structure and a companion contact engageable by the movable contact structure in the closed condition of the circuit breaker, and trip-free operating mechanism for said movable contact, said mechanism including a frame, a pair of levers pivoted to said frame, a pair of connecting links pivoted to each other and to said movable contact structure at a common pivotal axis, said links also being pivoted to said levers, respectively, a stored energy spring mechanism coupled to one of said levers and operable in a power stroke to drive one of said connecting links and thereby to effect quick closing of the circuit breaker, and a latching mechanism for normally arresting the other of said crossed levers.

11. A circuit breaker including a movable contact structure and a companion contact engageable by the movable contact structure in the closed condition of the circuit breaker, and trip-free operating mechanism for said movable contact, said mechanism including a pair of crossed levers having a common fixed pivotal axis, a pair of connecting links pivoted to each other and to said movable contact structure at a common pivotal axis, said links also being pivoted to said crossed levers, respectively, a stored-energy spring mechanism, a reciprocating lost motion coupling between said mechanism and one of said crossed levers, said mechanism operable in a power stroke acting through said coupling to drive one of said connecting links in a direction to close the circuit breaker and thereafter becoming independent of said operating mechanism, and a latching mechanism for normally arresting the other of said crossed levers.

12. A circuit breaker having a movable contact arm, and a companion contact engageable thereby, a driving link connected to said contact arm, a trip-free operating mechanism for actuating said driving link, said mechanism including a latch lever mounted between its ends for pivotal movement between a latched and an unlatched position, an intermediate link connected by pivots to one end of said latch lever and to said driving link, respectively, and forming a toggle therewith, drive means for erecting said toggle to close the circuit breaker, a latch prop mounted for movement between a latch lever engaging position and a latch lever releasing position, said prop being adapted to engage and latch one end of said latch lever, latch locking means responsive to circuit conditions for restraining the movement of said latch prop, said latch locking means being operable to release said latch prop to cause collapse of said toggle, said lever and said latch prop having mutually engaging portions effective in the unlatched condition of said lever to prevent said latch prop being obstructed by said latch lock during a subsequent relatching operation.

13. A circuit breaker having a movable contact arm, and a companion contact engageable thereby, a driving link connected to said contact arm, a trip-free operating mechanism for actuating said driving link, said mechanism including a latch lever mounted between its ends for pivotal movement between a latched and an unlatched position, said lever being provided with lateral projections adjacent one end, an intermediate link connected by pivots to one end of said latch lever and to said driving link, respectively, and forming a toggle therewith, drive means for erecting said toggle to close the circuit breaker, a latch prop mounted for movement between a latch lever engaging position and a latch lever releasing position, said latch prop being formed of two spaced plate-like members joined together at the ends thereof and adapted to receive said latch lever therebetween in the released unlatched position, said latch prop being adapted to engage one end of said latch lever to maintain said latch lever in its latched position, spring means biasing said latch lever end of said latch prop toward the pivot of said latch lever, latch locking means responsive to circuit conditions for arresting movement of said latch prop from said latch lever engaging position, said latch locking means being operable to release said latch prop to cause collapse of said toggle, said latch lever lateral projections engaging said plate-like members in the unlatched condition of said latch lever to prevent said latch prop being obstructed by said latch lock until said latch prop re-engages the end of said latch lever during subsequent relatching operation.

14. A circuit breaker having a relatively movable contact arm and a companion contact engageable by the movable contact, a driving link pivoted to said contact arm, first and second levers sharing a common fixed pivot intermediate their ends, first and second links pivoted to said driving link and individually pivoted to respective adjacent ends of said levers, said driving link and said first link forming a toggle when said first lever is arrested, means for releasably arresting said first lever, and means operable to drive said second lever to erect said toggle through said second link and thereby engage said contacts.

15. A circuit interrupter having a movable contact structure and a companion contact engageable by the movable contact structure and energy storage means operable for driving said movable contact structure into engagement with said companion contact, said energy storage means including opposed cams provided in sequence with an extensive positive-angle segment, a short negative-angle segment, and rapid drop-off region, cam followers engaging said cams, and energy storage spring means acting against said cam followers, coupling means between said cam followers and said movable contact structure, charging means for producing relative movement between said cams and said cam followers whereby said storage springs are charged as said cam followers ride along the positive angle segments of said cams, latch means to lock said cams when said cam followers are on the negative angle segments, and operable to release said storage means for transmission of energy to said coupling means.

16. A circuit interrupter having a movable contact structure and a companion contact engageable by the movable contact structure and energy storage means operable for driving said movable contact structure into engagement with said companion contact, said energy storage means including opposed storage springs having their remote ends fixed, means for charging said springs interposed between the free ends of said springs, means for releasably retaining said springs in their charged condition, coupling means including links connected to the free ends of said springs and pivoted together at a common point, said links being nearly parallel to the axis of said springs in their charged condition and at a prominent angle to the axis of said springs in their discharged condition, said common pivot of said links being operatively connected to said movable contact structure whereby closing of the movable contact against the companion contact is caused by the release of said storage springs from their charged condition.

17. Switching apparatus having companion contacts that are engaged in the closed condition of the apparatus, a spring acting on one of said contacts to apply contact pressure when the contacts are closed, and operating mechanism for driving one of said contacts against the other to close the switching apparatus, said operating mechanism including a pair of toggle links joined to each other at a common pivot, connecting means extending from said common pivot and arranged to constitute a driving connection to said one of said contacts, said toggle being arranged to operate said connecting means in the contact-closing direction as the toggle collapses, and spring means acting against remote portions of said toggle links, said spring means being disposed to drive said remote portions toward each other and thereby drive the toggle toward the collapsed configuration, and constraining means acting against said remote portions for causing the spring effort to be converted into contact-closing drive effort at said common pivot.

18. Switching apparatus having companion contacts that are engaged in the closed condition of the apparatus, a spring acting on one of said contacts to apply contact pressure when the contacts are closed, and operating mechanism for driving one of said contacts against the other to close the switching apparatus, said operating mechanism including a pair of toggle links joined to each other, connecting means extending from said common pivot and arranged to constitute a driving connection to said one of said contacts, said toggle being arranged to operate said connecting means in the contact-closing direction as the toggle collapses, at a common pivot and chargeable spring means acting against remote portions of said toggle links, said spring means being disposed to drive said remote portions toward each other and thereby drive the toggle toward the collapsed configuration, constraining means acting against said remote portions for causing the spring effort to be converted into contact closing drive effort at said common pivot, and charging means operatively connected to said spring means.

19. A circuit breaker having a moving contact arm and actuating means therefor including a stored energy spring mechanism, said stored energy mechanism including a double-lobed rotary cam having diametrically opposite extended rise portions, limited negative-angle portions, and drop-off portions, a pair of diametrically opposite cam followers cooperating with said double-lobed cam, oppositely acting compression spring units each having an end connection to a respective one of said cam followers, a housing providing a central bearing for said rotary cam and providing diametrically opposite passages containing said compression spring units, said housing also having guide tracks for said end connection of said spring units, the ends of said spring units remote from said cam followers bearing against respective parts of said housing, driving means for operating said cam through a spring-charging stroke during which said cam followers traverse said extended rise portions of the cam, and a pair of toggle links connected to each other at a knee, the extremities of said toggle links being connected to said cam followers, said compression spring units being subjected to a maximum of stress when said toggle links are extended and being under reduced stress when said toggle links have been operated by the spring units in a working stroke to assume a relative collapsed configuration, the knee of said toggle links being connected in driving relation to said movable contact arm in the closing direction of operation during said working stroke and being arranged to operate transverse to said guide tracks.

20. An energy-storage mechanism for circuit breakers and the like, including a double-lobed rotary cam having diametrically opposite extended rise portions, limited negative-angle portions, and drop-off portions, a pair of diametrically opposite cam followers cooperating with said double-lobed cam, oppositely acting compression spring units each having one end connected to a respective one of said cam followers, a housing providing a central bearing for said rotary cam and providing diametrically opposite passages containing said compression spring units, the ends of said spring units remote from said cam followers bearing against respective parts of said housing, driving means for operating said cam through a spring-charging stroke during which said cam followers traverse said extended rise portions of the cam, and a pair of toggle links connected to each other at a knee, the extremities of said toggle links remote from said knee being connected to said cam followers, said compression spring units being subjected to a maximum of stress when said toggle links are extended and being under reduced stress when said toggle links have been operated by the spring units in an energy output stroke to assume a relative collapsed configuration, the knee of said toggle links constituting a mechanical energy output point.

21. An energy-storage mechanism for actuating circuit breakers and the like, including a cam having at least one extended positive-angle rise portion, at least one negative-angle portion of short extent and at least one steep drop-off portion, in succession, a cam follower bearing against said cam, energy-storage spring means biasing said cam follower against said cam and providing an energy output point, a ratchet wheel united to said cam and having at least one flat between successive teeth, a driving pawl cooperating with said ratchet, a reciprocating actuator for operating said driving pawl through forward and return strokes, a fixed detent cooperating with said ratchet to prevent return motion of the ratchet during return strokes of said driving pawl, said pawls being arranged to cooperate with a said flat only when said cam follower cooperates with a said negative cam portion, and means for latching said cam against advance thereof by said energy-storage spring means when the cam follower bears against a said negative-angle cam portion.

22. An energy-storage mechanism for actuating circuit breakers and the like, including a double-lobed cam having diametrically opposite extended positive-angle rise portions, negative-angle portions of short extent and steep drop-off portions, in succession, diametrically opposite cam followers bearing against said cam, stored-energy spring means biasing said cam followers against said cam, respective links joined to said cam followers and joined to each other at a common pivot constituting an energy-output point, means for rotating said cam so as to charge said spring means during the travel of said cam followers along said extended rise portions of the cam, said drive means including a ratchet wheel united to said cam and having a pair of diametrically opposite flats, a driving pawl cooperating with said ratchet wheel and reciprocating actuator for said driving pawl cooperable through forward and return strokes, and a pair of fixed detent pawls cooperating with said ratchet wheel to prevent return motion of the ratchet wheel during return strokes of said driving pawl, said detent pawls being spaced from each other by an angle that differs substantially from the angular separation between said flats, whereby one of said detent pawls is available to cooperate with a tooth of the ratchet at all times despite the possible engagement of the other of said detent pawls with a flat, and means for latching said double-lobed cam against advance thereof by said stored-energy spring means and said cam followers when the latter bear against said negative-angle cam portions.

23. An energy-storage mechanism for actuating circuit breakers and the like, including a double-lobed cam having diametrically opposite extended positive-angle rise portions, negative-angle portions of short extent and steep drop-off portions, in succession, diametrically opposite cam followers bearing against said cam, energy-storage spring means biasing said cam followers against said cam, respective links joined to said cam followers and joined to each other at a common pivot constituting an energy-output point, means for rotating said cam so as to charge said energy-storage spring means during the travel of said cam followers along said extended rise portions of the cam, said drive means including a ratchet wheel united to said cam and having a pair of diametrically opposite flats, a driving pawl cooperating with said ratchet wheel and a reciprocating actuator for said driving pawl operable through forward and return strokes and fixed detent pawl diametrically opposite said driving pawl and cooperating with said ratchet wheel to prevent return motion of the ratchet wheel during return strokes of said drive pawl, said driving and detent pawls being arranged for cooperation with said flats only when said cam followers are in cooperation with said negative-angle cam portions, and means for latching said double-lobed cam against advance thereof by said stored-energy spring means and said cam followers when the latter bear against said negative-angle cam portions.

24. A circuit breaker of the type having a pair of terminals, a movable contact arm connected to one of said terminals, a companion contact connected to the other of said terminals and engageable by said contact arm in its closing stroke, the foregoing arrangement inherently developing strong blow-off force acting on said contact arm during short-circuits, and actuating mechanism for insuring firm closing operation of the contact arm despite the possible development of such blow-off force, said actuating mechanism including a pair of toggle links connected together at a knee and having spring means biasing the extremities of the toggle links toward each other and operable in a working stroke to displace said extremities toward one another, said spring means being subjected to its maximum stress when said toggle is in its extended configuration, and a linkage interconnecting the knee of said toggle and said contact arm for operating the latter in its closing stroke during the working stroke of said spring means, said toggle links assuming progressively reducing angles therebetween during said working stroke so that the force available at said knee for operating said contact arm remains high despite the progressive reduction of spring force during the working stroke thereof.

25. A circuit breaker of the type having a pair of terminals, a movable contact arm connected to one of said terminals, a companion contact connected to the other of said terminals and engageable by said contact arm in its closing stroke, the foregoing arrangement inherently developing strong blow-off force acting on said contact arm during short-circuits, a linkage including a first toggle for closing said contact arm against said companion contact, said first toggle becoming extended during the final portions of the closing stroke, and actuating mechanism for insuring firm closing operation of the linkage despite the possible development of such blow-off force, said actuating mechanism including a second toggle having a pair of toggle links connected together at a knee and having spring means biasing the extremities of the toggle links toward each other and operable in a working stroke to displace said extremities toward one another said spring means being subjected to its maximum stress when said second toggle is in its extended configuration, and said linkage including means interconnecting the knee of said second toggle and the knee of said first toggle for operating the latter to drive said contact arm in its closing stroke during the working stroke of said spring means, the links of said second toggle assuming progressively reduced angles therebetween during said working stroke so that the force available at said knee of said second toggle for straightening said first toggle and operating said contact arm remains high despite the progressive reduction of spring force during the working stroke thereof.

26. A circuit breaker of the type having a pair of terminals, a movable contact arm connected to one of said terminals, a companion contact connected to the other of said terminals and engageable by said contact arm in its closing stroke, spring contact-bias means for producing high contact pressure between said companion contact and said contact arm, a linkage including a first toggle for closing said contact arm against said companion contact and developing said contact pressure therebetween, said first toggle becoming extended during the closing stroke, and actuating mechanism for insuring firm closing operation of the linkage despite the opposing action of the spring contact-bias means, said actuating mechanism including a second toggle having a pair of toggle links connected together at a knee and having spring means biasing the extremities of the toggle links toward each other and operable in a working stroke to displace said extremities toward one another said spring means being subjected to its maximum stress when said second toggle is in its extended configuration, and said linkage interconnecting the knee of said second toggle and the knee of said first toggle for operating the latter to drive said contact arm in its closing stroke during the working stroke of said spring means, said second toggle links assuming progressively reduced angles therebetween during said working stroke so that the force available at said knee of said second toggle for extending said first toggle and thereby operating said contact arm remains high despite the progressive reduction of spring force during the working stroke thereof.

27. A circuit breaker having a pivoted contact arm, a companion contact engageable by the pivoted contact arm in the closed condition of the circuit breaker, a driving link having one end connected to said contact arm by a pivot, a trip-free actuating and overload release linkage pivoted to said driving link, spring biasing means acting on said contact arm and in the contact opening direction, a cam follower mounted on said driving link remote from said one end, and a fixed cam engageable by said cam follower, said cam having a configuration which at least approximates an arc having said pivot as its center when said contact arm is in the open-contact position, said cam-follower assuming various positions along said cam depending upon the configuration of said trip-free linkage, and said cam acting to establish the extent of opening of said pivoted contact arm.

References Cited in the file of this patent

UNITED STATES PATENTS

| | | |
|---|---|---|
| 1,231,367 | Jacobs | June 26, 1917 |
| 1,647,010 | Marston | Oct. 25, 1927 |
| 2,994,753 | Astteford et al. | Aug. 1, 1961 |